J. S. PALMER.

Bracelets.

No. 5,571. Reissued September 9, 1873.

Witnesses:

Eben W Waterhouse

John A Capron

Inventor:

John S. Palmer

AM. PHOTO-LITHOGRAPHIC Co. N.Y. (OSBORNE'S PROCESS)

UNITED STATES PATENT OFFICE.

JOHN S. PALMER, OF PROVIDENCE, RHODE ISLAND.

IMPROVEMENT IN BRACELETS.

Specification forming part of Letters Patent No. 731, dated March 19, 1861; reissue No. 5,571, dated September 9, 1873; application filed July 24, 1873.

*To all whom it may concern:*

Be it known that I, JOHN S. PALMER, of Providence, in the county of Providence and State of Rhode Island, have invented a new and useful Improvement in Constructing Bracelets, which is also applicable in constructing finger-rings, ear-hoops, and some other articles of jewelry; and I do hereby declare that the following is a full, clear, and exact description thereof, reference being had to the annexed drawings, and to the letters of reference marked thereon, in which—

Figure 1:
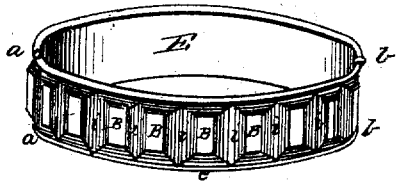
Figure 2:
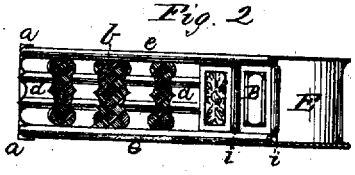
Figure 4:
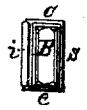
Figure 3:
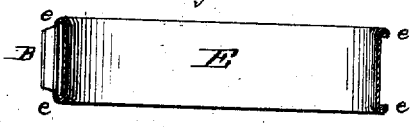

Figure 1 is a perspective view of an improved bracelet having my improvements therein. Fig. 2 is a front view and section of the same, showing different styles of the ornamental parts, one being a continuous strip. Fig. 3 shows a front view of the foundation-plate with its turned edges. Fig. 4 is a plan of one variety of ornamental plate; and Fig. 5, a cross-section of the foundation-plate before and after its edges have been bent.

Similar letters of reference denote like parts in all the figures.

It has formerly been the practice to form the front or ornamental plate of such bracelets in one piece, with the edges turned at right angles therefrom, after which the superfluous stock was trimmed off and the said edge soldered to a flat plate or lining, and the superfluous stock trimmed therefrom. This trimming off of the edge of the lining leaves the baser metal exposed, plated stock being generally used, which, coming in contact with the wrist or flesh of the wearer, forms an oxide which penetrates the soldered joint and separates the lining from the front.

My invention consists primarily in turning over the edges of the foundation-plate to form an overlaying lip or flange upon each edge of the outside of the bracelet, thus forming a smooth retroverted edge, which serves to support and retain the outer part of the bracelet, and keep the joint out of contact with the flesh. The die which stamps or forms the ornamental plate is often expensive, and if a portion of the design is defaced by accident or otherwise, the whole die is rendered worthless. Again, as each die produces but one design, a number of such dies are necessary to produce a variety of patterns or styles—that is, a special die for every different style of bracelet. My invention therefore, further, consists in ornamental work, composed of a number of metal plates of designs in bass-relief or chased work, or suitable plates containing hair-work, precious stones, or miniatures, held to place by the turned edges of the under plate whereby different combinations of ornamental work may be produced upon one foundation-plate, and thus a great variety of styles at much less expense than by the ordinary process of manufacture.

To enable others skilled in the art to make use of my invention, I will proceed to describe the construction and operation.

Figure 5:
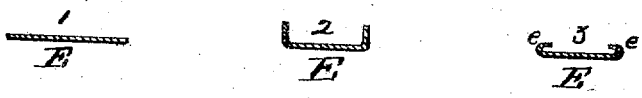

A strip of metal of the width shown in Fig. 5, No 1, is passed through a set of rolls, which turn the edges as shown in No. 3, the form of the rolls and the mode of operation being sufficiently familiar to workers in sheet metal to require no description here. The turning or rolling the edges of similar rings of sheet metal is also generally practiced to stiffen such rings, and for that purpose is well known, and I do not claim it as my invention. The above stock is formed into a ring or oval, composed of two pieces, which are united at *a*, Fig. 1, in a hinge-joint, and at *b* by a catch or spring fastening. Fig. 4 represents an ornamental plate of die-work in bass-relief, having projecting lips or edges *c c* at each end, and a ridge or bead, *i*, which overlaps the opposite thin edge S upon the adjoining plate, and hides the intervening space, as shown in Fig. 2. *d d*, Fig. 2, represents a metal plate having openings therein, beneath which plate is placed braided hair-work *l*, which is visible through the said openings, and which, by contrast with the polished metal plate, produces a highly ornamental effect. These ornaments or plates are slid or introduced beneath the lips *e e* of the foundation-plate in their proper order and position, the lips *e e* overlapping the lips or edges *c c* of the plates B B or strip *b b*, and the beads *i* overlaying the thin edges S of the adjoining plate, Figs. 2 and 3. That one of the beaded plates which is inserted next to the points *a* and *b* of the bracelet, Figs. 1 and 2, is secured in its place to the foundation-plate by a rivet passing through both, and thus the several ornaments are permanently secured therein, the retroverted edges of the foundation-plate positively retaining in place all the ornamental pieces, no soldering being required.

Should the bracelet be bent or broken, it will only be necessary to remove the rivets, when the ornaments may be readily removed and the injured parts repaired, or new parts substituted for those which are broken or defaced. When a continuous overlapped plate is employed, as at *b b*, instead of the series of small ones, as at E E, the riveting may the more readily be dispensed with, as the plate is self-sustaining.

It will be observed that a multiplicity of designs in bass-relief or mountings of precious stones, shell, and hair-work, &c., may be inserted and combined upon one bracelet, and every different combination produces a different style or pattern, and in such a manner that no soldering is required.

The dies which stamp the ornamental plates are inexpensive compared with those for stamping an entire front or outer surface, and if one is injured, another of a like or of a different design may be made to take its place at a trifling expense.

In the construction of finger-rings, ear-hoops, and other articles upon this principle, it will only be necessary to vary the size and form of the foundation-plate and ornaments, to combine a variety of designs, and thus produce readily and cheaply numerous styles of such articles.

I do not claim, broadly, turning over the edge of a ring of sheet metal by means of rolls, for the purpose of forming a rounded edge, or for stiffening such ring, as this well known and not my invention.

I claim—

1. The improvement in bracelets and similar articles, consisting in a plate made with turned edges, and another plate or part combined with the same, and protected by such turned edges, whereby the seam or joint is kept from contact with the flesh.

2. The combination of the lips *e e*, of the foundation-plate, with the ornamental metal plates, or their equivalents, constructed in the manner substantially as described, for the purpose herein specified.

JOHN S. PALMER.

Witnesses:

EBEN W. WATERHOUSE,

JOHN A. CAPRON.